United States Patent [19]

Connen et al.

[11] Patent Number: 4,740,336
[45] Date of Patent: Apr. 26, 1988

[54] METHOD OF SHAPING TUBULAR GASKET

[75] Inventors: Yves Connen; Roland Paris, both of Vitre, France

[73] Assignee: Compagnie des Produits Industriels de l'Ouest, Nantes, France

[21] Appl. No.: 843,300

[22] Filed: Mar. 24, 1986

[30] Foreign Application Priority Data

Mar. 22, 1985 [FR] France ................. 85 04447

[51] Int. Cl.⁴ ............... B29C 53/08; B29C 69/02; B29C 35/02
[52] U.S. Cl. .................. 264/40.1; 264/295; 264/296; 264/320; 264/323; 264/515; 264/516; 264/531; 264/573
[58] Field of Search ............... 264/514–516, 264/531, 573, 295, 6, 320, 322, 323

[56] References Cited

U.S. PATENT DOCUMENTS 3,859,408  1/1975  Voss et al. .............. 264/573
4,183,778  1/1980  Mesnel ................... 264/261
4,440,712  4/1984  Imgram ................... 264/295

FOREIGN PATENT DOCUMENTS 2283300  9/1978  France .

Primary Examiner—Jan H. Silbaugh
Assistant Examiner—Neil Michael McCarthy
Attorney, Agent, or Firm—Oblon, Fisher, Spivak, McClelland & Maier

[57] ABSTRACT

In a process for making a gasket with a tubular shape, a tubular blank of elastomeric material is extruded and zones are marked along its length, the zones corresponding to a location along the length of the gasket which is to undergo a change of shape, dimension, or orientation through a shaping operation. The shaping operation involves a preliminary step of attaching a U-clip to the blank and introducing the blank, with the U-clip attached to it, into a shaper passage which has a guide element extending into the passage, and guiding the blank through the shaper passage while the guide element extends into the U-clip.

6 Claims, 2 Drawing Sheets

U.S. Patent Apr. 26, 1988 Sheet 1 of 2 4,740,336
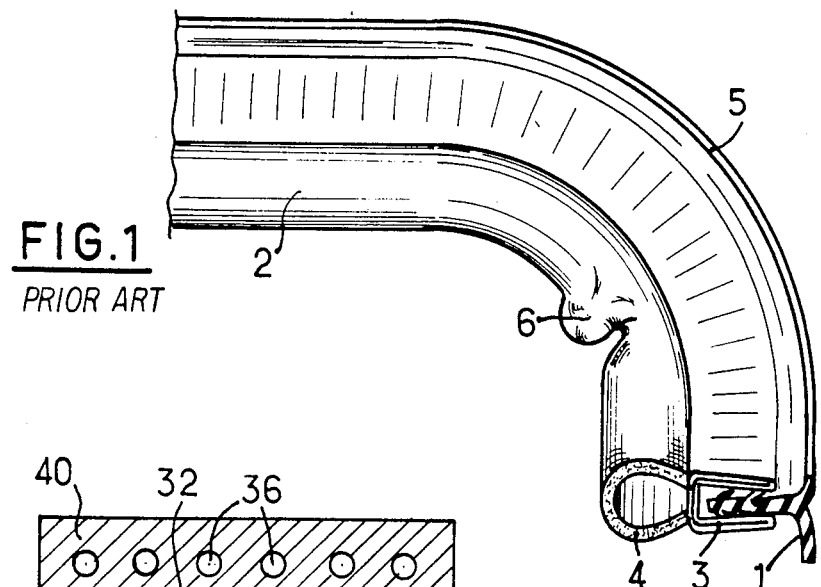
FIG.1
PRIOR ART
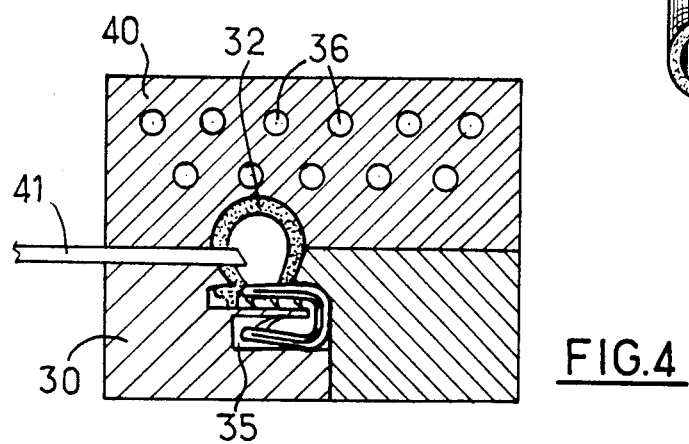
FIG.4
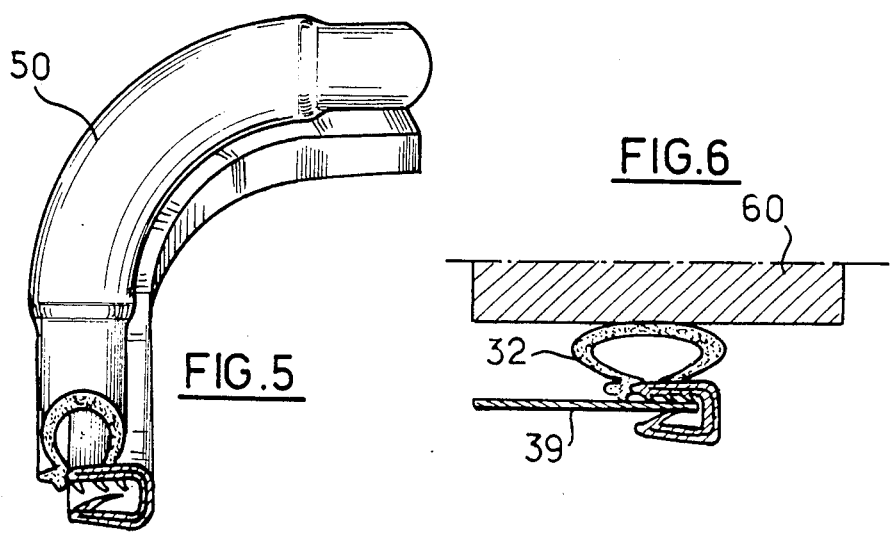
FIG.5
FIG.6

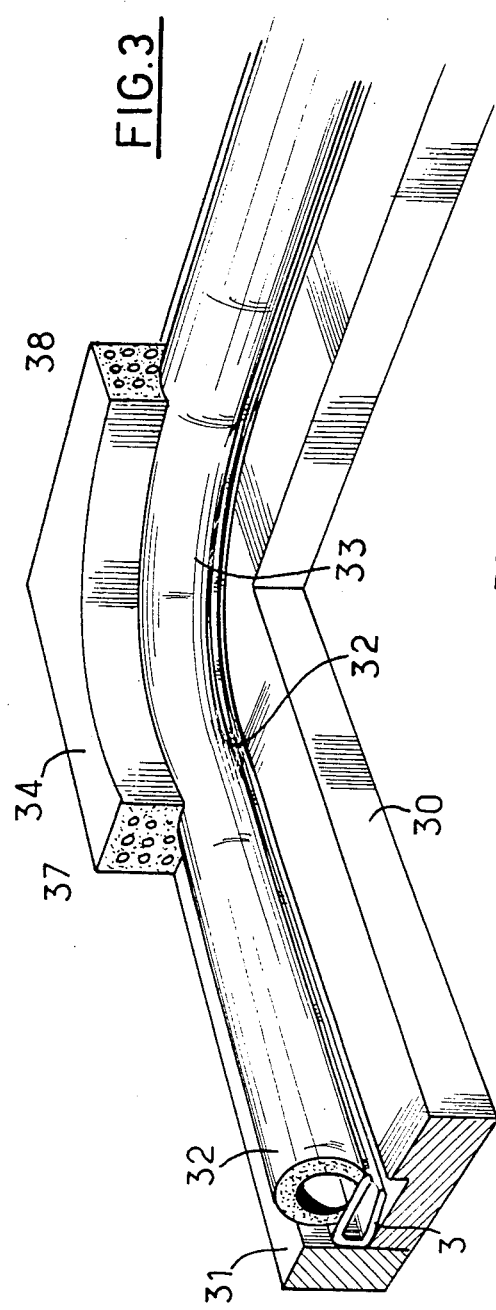
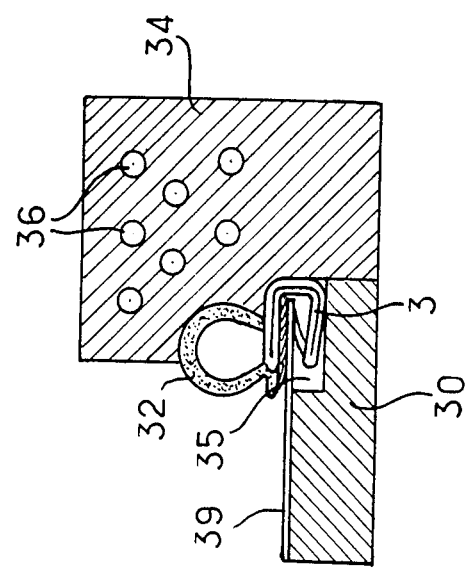

METHOD OF SHAPING TUBULAR GASKET

BACKGROUND OF THE INVENTION

1. Field of the Invention:

This invention relates to a protective gasket with a tubular shape and a length predetermined for fitting the geometric variations of its fastening frame.

2. Description of the Related Art:

These gaskets are encountered each time that it is desired to assure sealing between a closing panel and the frame of an opening, particularly on a motor vehicle at the doors, the trunk, etc. but also on electric appliances, such as dishwashers, refrigerators, etc.

Known gaskets generally have a U-shaped clip, having a metal reinforcement, which provides a gripping effect for the gasket. The clip is covered with an elastomer of plastic, deposited by coextrusion.

Inner lips of the clip provide the sealing on the frame. The gasket itself consists of a tube, generally made of cellular rubber. Most often it is continuously formed by coextrusion and covulcanization while connected to the clip.

The frame on which the gasket is most often mounted has corners or fillets, curves and changes of planes. All of these geometric variations have the consequence of tensioning or compressing the gasket. The gasket is consequently deformed, the defects thus created destroying the quality of sealing.

To avoid these deformations in the gasket across small radius curves, several techniques are presently used:

(1) Placing a strip of sponge rubber or polyurethane foam in the tube or the tubular profile of the gasket;

(2) Injecting into the tube a special foam which expands at ambient temperature or with an addition of heat;

(3) Molding a rubber or thermoplastic elastomer in the deformed zones of the gasket to obtain a shape that perfectly fits the volume to be filled; or (4) Using a continuous extrusion process that causes the shape of the profile to vary by increasing or reducing the thickness of the tube.

All of these processes have a major drawback: they harden the gasket and thereby increase the force necessary for closing the panel. Moreover, they entail a significant increase in cost, either because they necessitate an additional operation with a higher cost, or because they force the extrusion speed of the gasket to be reduced.

SUMMARY OF THE INVENTION

This invention has as its object the provision of gaskets with a locally modified profile that do not exhibit the drawbacks of undesirable deformations and high cost.

In the process for making the gasket, a tubular blank of elastomeric material is extruded, possibly in a partly cured state. Zones of the extruded blank which are to be deformed according to the predetermined shape of the panel for which the gasket is to provide a seal are marked by any known making means during the extruding step. The extruded blank may be cut to size, and may also have a clip attached thereto. The extruded blank is thereafter processed at the marked zones in such a manner as to permanently and plastically deform the blank. The processing takes place by positioning the zones of the blank in a passage of a shaper. The positioning of the zones of the blank in the passage of the shaper is performed by introducing the blank in the shaper passage, the shaper passage having a guide element extending into the passage, and guiding the blank into the shaper with the guide element fitted into a U-clip attached to the blank prior to processing, until the zones are properly positioned in the shaper. After positioning, there occurs heating the zones and then cooling the zones. In the case of a partially cured blank, the heating step should be sufficient to fully cure the blank. The deformation can be either curving of the blank along its length, increasing the diameter of the blank, flattening the blank, or some other deformation.

The shaper is preferably formed with a sole plate having a guiding element for the blank and a recess into which the clip can be slid. A jaw fits over the blank at the marked zones and includes heating and cooling means. The jaw can, if desired, completely enclose the blank. The interior of the blank should be pressurized at the zones during the heating and cooling step. For this purpose, a syringe may be provided for introducing pressurized gas into the blank within the jaw.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a view in perspective of the assembly of a gasket according to the prior art, showing a type of undesirable deformation;

FIG. 2 is a view in cross section of the shaping of a bend of the gasket with a tubular profile;

FIG. 3 is a view in perspective of the operation of the preceding figure;

FIG. 4 is a view in cross section of a first variant of the gasket making method;

FIG. 5 is a view in perspective of another variant of processing the gasket according to the invention.

DETAILED DESCRIPTION OF THE PREFERRED EMBODIMENTS

With reference to FIG. 1, there is shown the frame 1 of an opening provided with a generally used standard gasket 2. It is kept on the frame by a U-clip 3, providing a gripping effect, to which an elastomer tube 4 is fixed. It is found that at bend 5, deformations 6 harmful to the desired sealing effect occur.

The above drawback is avoided by using the gaskets according to this invention, whose profile is locally modified before it is applied to the support.

The principle of the invention consists in using a hot shaping process which makes it possible to give the gasket the orientation and appropriate geometry assuring its mounting without deformation on the frame which receives it.

For this purpose, during the extrusion of the tube 4, zones are marked on its length corresponding to a curve of the support on which it will be positioned. At the markings thus obtained, tube 4 will later be locally deformed during a specific operation, prior to its mounting on the fastening frame. This makes it possible to absorb the variations of dimensions resulting from its final positioning, without giving rise to deformations 6 harmful to the gasket, as can be seen in FIG. 1.

To perform the above operation, the extruded tube is first cut to lengths corresponding to the seals to be obtained, then processed by a specific shaper to the shape of the gasket to be obtained. This device can be seen in FIG. 3.

A soleplate 30 has at its periphery a border or guide element 31 along which gasket blank 32 is guided. The border 31 is provided with a jaw 34 having heating or cooling elements therein. The face of the jaw in contact with a portion of the tube 4 marked for bending during the extrusion of the tube is curved at the jaw into a bend 33 to give to the gasket a final shape corresponding to its intended position on frame 1.

Along the path of blank 32, the soleplate exhibits a recess 35 inside of which part 3 constituting the U-clip moves. A guide element 39 fixed to the soleplate extends partially over the recess and fits and into the U-clip, thus guiding the passage of said blank 32.

The heating and cooling means of jaw 34 is formed by channels 36 inside of which suitable fluids can circulate, the fluids, arriving at end 37 of the shaper and escaping from it at end 38. Naturally, any equivalent means could replace this fluid circulation.

The process for shaping seal 32 is performed as follows:

The blank 32 is obtained by extrusion in a previous operation, marked at the desired location for the bend 33 to be shaped and cut to the final length. The blank 32 is then advanced in recess 35 of soleplate 30 of the shaper until the marking for bend 30 is located in the center of jaw 34.

Then the temperature of the jaw is raised by introducing heated fluid through channels 36 while blowing a neutral gas or fluid into blank 32 whose ends have been previously plugged, for example by pinching. The resultant pressure makes it possible to eliminate the deformations such as 6 of FIG. 1 that appeared during folding at bend 33. The cooling of blank 32, preferably speeded up by circulation of a cold fluid in channels 36 of jaw 34, occurs "in situ." A slight under-curing of the constituent elastomer of blank 32, during continuous vulcanization after its extrusion can facilitate the above operation and in particular the local post-curing phase at bend 33.

The variant illustrated in FIG. 4 shows a completely guided shaping which makes it possible to obtain a profile following, at any point, the curvature of the frame which will receive the gasket. It is noted that unlike the device of FIG. 3, jaw 40 totally envelopes the section of blank 32.

The jaw 40 can consist of a mold having several parts, which covers about fifteen centimeters of tube 4 at bend 33.

The ends of blank 32 being pinched, a neutral gas is then blown inside by a syringe 41 introduced through a nonworking part of the gasket, so as not to harm its sealing qualities in use.

By use of the above process, increases can be made in diameter 50 (FIG. 5), as a function of the shape of the mold, located at the bend or on a rectilinear part, or else changes of profile can be made, for example to form a locally eliptical section, as seen in FIG. 6.

The advantage of this final transformation step, as seen in FIG. 6, resides in the fact that it is thus possible to absorb a local excess thickness of the support (an additional sheet thickness on several centimeters of length) without causing a concomitant excess thickness of the gasket.

This result is obtained by locally pressing the wall of blank 32 by a shaper 60, followed by a rise in the temperature of said blank 32 due to a flow of hot air followed by cooling, thereby causing local memorizing of the new shape obtained.

This operation can be performed with or without an internal excess pressure.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for making a gasket with a tubular profile for a panel with a predetermined shape, comprising the steps of:

extruding a tubular blank of elastomeric material having a predetermined length;

marking zones along said length of said blank according to said predetermined shape;

attaching a U-clip to said tubular blank; introducing said blank, with said U-clip attached thereto, into a shaper passage, said shaper passage having a guide element extending into said passage, and guiding said blank into said shaper with said guide element fitted into said U-clip until said zones are positioned in said shaper; and processing said marked zones in such a manner as to permanently and plastically deform said blank at said zones by the steps of elastically deforming said zones of said blank in said shaper passage, said shaper passage having a shape corresponding to said gasket to be formed;

heating said zones in said shaper passage; and cooling said zones in said shaper passage, whereby said zones are plastically deformed.

2. The process of claim 1 including the steps of:

sealing the ends of said blank; and pressurizing the interior of said sealed blank prior to said heating step.

3. The process of claim 1 wherein said extruded blank is partially cured and wherein said step of heating said zones in said shaper passage is carried out to a degree sufficient to complete curing of said blank.

4. The process of claim 1 wherein said processing step includes the step of modifying the diameter of said blank at least one of said zones.

5. The process of claim 1 wherein said processing step includes the step of modifying a sectional shape of at least one of said blank at said zones.

6. The process of claim 1 wherein said step of elastically deforming results in a curvature in the length of said blank.

* * * * *